Q. C. CULLEY.
Cheese Turner.

No. 77,004.  Patented April 21, 1868.

Witnesses.
J. H. Burridge
K. Coon

Inventor
Q. C. Culley

United States Patent Office.

Q. C. CULLEY, OF ASHTABULA, OHIO.

Letters Patent No. 77,004, dated April 21, 1868.

IMPROVEMENT IN CHEESE-TURNING COVER.

*The Schedule referred to in these Letters Patent and making part of the same.*

TO ALL WHOM IT MAY CONCERN:

Be it known that I, Q. C. CULLEY, of Ashtabula, in the county of Ashtabula, and State of Ohio, have invented certain new and useful Improvements in Cheese-Turning Covers; and I do hereby declare that the following is a full and complete description of the same, reference being had to the accompanying drawings, making a part of this specification, in which—

Like letters of reference refer to like parts in the views.

Figure 1:
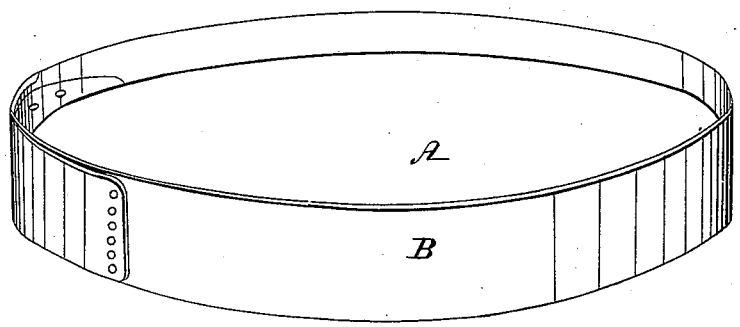
Figure 1 is a perspective view of the cover.
Figure 2:
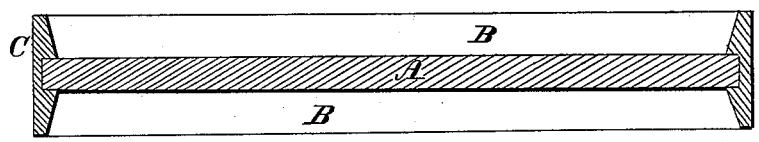
Figure 2 is a transverse section.

This cover consists of the central disk A, provided with a deep marginal rim, B, proceeding from each side, as shown in fig. 2.

It will be observed that this rim is much thicker through the middle than at the edges, and that it slants backward from the face of the board to the edges. The manner of securing the rim to the disk is as follows: Longitudinally through the cutter of the rim or board is cut a deep groove, C, in which the edge of the disk is fitted, as shown in fig. 2. The ends of the band or rim are then brought and lapped over each other, and secured by railings or otherwise.

The practical use of this cover is for turning green cheese while in the process of curing, and the usual manner of making them is by nailing the rim to the board or disk, allowing said rim to proceed from one side only.

The objections to the covers thus made are, that in consequence of the dampness the board receives from the cheese, it is liable, by its expansion and contraction, to warp and draw apart from the band or rim, the result of which is that it becomes weak, and often breaks down by the weight of the cheese, more especially if the cheese is a large one. Another objection to these covers is, that in consequence of their being made with a rim on one side only, the side of the cover in contact with the cheese, on becoming damp, and the cheese require turning, they must be removed and set aside to dry, and a dry cover used instead, as a continual use of a damp cover would cause the cheese to mould, and become injured thereby; hence twice the number of covers or boards are required as there are cheeses.

But by the use of a cover constructed with a rim raised upon each side, as above described, one cover becomes in use equal to two of the ordinary ones, for as one side of the cover is in contact with the cheese, and necessarily damp, the other, which may have been used, is becoming dry; therefore one side of the cover will be dry and ready to receive the cheese by the time the opposite side has become damp and requires changing; thus the dry side of one cover on which the cheese is standing is ready, on turning the cheese, to be placed upon the appropriate one, and so on through the entire range of cheeses.

It will be obvious by this that one cover only will be required for each cheese, instead of two, if made in the ordinary way. They are also much stronger, by having the disk fitted into the rim in the manner as above described.

What I claim as my improvement, and desire to secure by Letters Patent, is—

The cover A, provided with a rim or flange, B, projecting from each side, in the manner as and for the purpose specified.

Q. C. CULLEY.

Witnesses:
W. H. BURRIDGE,
J. HOLMES.